United States Patent
Zhang et al.

(10) Patent No.: US 10,779,687 B2
(45) Date of Patent: Sep. 22, 2020

(54) INTELLIGENT SEASONING BOX FOR KITCHEN

(71) Applicant: Hanqiu Zhang, Guangdong (CN)

(72) Inventors: Xiaolin Zhang, Guangdong (CN); Hanqiu Zhang, Guangdong (CN)

(73) Assignee: Hanqiu Zhang, Shenzhen (CN)

( * ) Notice: Subject to any disclaimer, the term of this patent is extended or adjusted under 35 U.S.C. 154(b) by 267 days.

(21) Appl. No.: 15/986,801

(22) Filed: May 22, 2018

(65) Prior Publication Data
US 2019/0239698 A1    Aug. 8, 2019

(30) Foreign Application Priority Data

Feb. 6, 2018 (CN) .................... 2018 2 0198872 U
Feb. 6, 2018 (CN) .................... 2018 2 0198874 U

(51) Int. Cl.
*A47J 47/01* (2006.01)
*A47J 37/10* (2006.01)
(Continued)

(52) U.S. Cl.
CPC .............. *A47J 47/01* (2013.01); *A47J 36/00* (2013.01); *A47J 37/106* (2013.01); *A47J 47/02* (2013.01); *B67D 3/0003* (2013.01); *B67D 3/0029* (2013.01)

(58) Field of Classification Search
CPC . A47J 47/01; A47J 47/02; A47J 47/04; G01K 2207/00; G01K 2207/02; G01K 2207/06; G01K 2207/08
See application file for complete search history.

(56) References Cited

U.S. PATENT DOCUMENTS

| 6,158,227 A * | 12/2000 | Seeley | G01K 1/14 340/585 |
| 2015/0238051 A1* | 8/2015 | Xu | A47J 36/34 99/487 |
| 2017/0042383 A1* | 2/2017 | Jin | A47J 47/01 |

FOREIGN PATENT DOCUMENTS

CN         107402551 A    * 11/2017

OTHER PUBLICATIONS

CN-107402551-A English translation (Year: 2017).*

* cited by examiner

*Primary Examiner* — Jason L Vaughan
*Assistant Examiner* — Amanda Kreiling
(74) *Attorney, Agent, or Firm* — Wayne & Ken, LLC; Tony Hom

(57) ABSTRACT

The present invention discloses an intelligent seasoning box for a kitchen, comprising a shell, a seasoning conveying component, a temperature monitor and a master controller, wherein the seasoning conveying component is a liquid-seasoning conveying component; both the seasoning conveying component and the master controller are arranged in the shell; the temperature monitor is connected by a universal hose and points to the center of a frying pan; the seasoning conveying component and the temperature monitor are electrically connected with the master controller respectively; the shell is provided with a containing cavity for containing liquid-seasoning bottles; the seasoning conveying component comprises conveying pipes, conveying pumps and a spraying nozzle; the conveying pumps are electrically connected with the master controller. The intelligent seasoning box for the kitchen in the present invention has the beneficial effects that the whole process of cooking can be completed under monitoring of internal application programs.

11 Claims, 9 Drawing Sheets

(51) Int. Cl.
*B67D 3/00* (2006.01)
*A47J 47/02* (2006.01)
*A47J 36/00* (2006.01)

INTELLIGENT SEASONING BOX FOR KITCHEN

TECHNICAL FIELD

The present invention relates to electric appliances for a kitchen, in particular to an intelligent seasoning box for a kitchen with automatic seasoning addition.

BACKGROUND

Through evolution and inheritance for thousands of years, people reprocess raw food and cook them to be so delicious today, and especially, Chinese food is very popular, but it is hard to cook them well. Chinese food is not only complex in preparation process, but also quite different in taste due to operating habits of different people. Chinese cooking skills seem to be inscrutable, but no matter how complex they are, the Chinese cooking skills are concluded as nothing but three key elements, i.e., 1. matching ratio of main materials and auxiliary materials and correct use of all seasonings; 2. temperature control at different stages; 3. reasonable time control. By different combinations of the three cooking elements, the tastes of the food are quite different, and nutritional ingredients are different.

For a long time, a method is desired for making the traditional complex cooking methods become simple, easy to learn and more efficient, and with the vigorous development of Internet and computer technologies, this desire is coming true gradually. Currently, many automatic products such as automatic household frying machines and cooking robots and the like for the kitchen have been launched on the market in China, but for now, kitchen automation has only been in an initial stage. Many product technologies are immature, and implementation solutions also have many defects. These technologies are mostly intelligent special equipment for the kitchen in the future, with complex structures and cost of thousands of yuan and even ten thousands of yuan. Thus, these technologies are not applicable to ordinary families. The equipment only can be operated according to pre-stored menus. The quantity of the menus is limited and cannot be modified, and the use amounts of the main materials, the auxiliary materials and the seasonings also cannot be automatically adjusted according to the quantity change of family members. A temperature measuring method is generally to measure the temperature of a pan bottom or an oven surface. The temperature of the pan bottom or the temperature of the oven surface cannot represent the temperature of the processed food materials, so the method is not scientific for measuring the temperature. No wireless communication function is achieved; interactive use of Internet clouds and intelligent mobile APPs cannot be realized; the automation degree is low; use is limited; cleaning is difficult; and in fact, manual labor cannot be effectively relieved.

SUMMARY

The purpose of the present invention is to provide an intelligent seasoning box for a kitchen, which can realize automatic feeding of liquid seasonings in a cooking process and automatic control of the dosage of fed solid seasonings so as to avoid the defect of different tastes of food due to habit differences of manual feeding of the seasonings. Meanwhile, the intelligent seasoning box can also realize long-distance automatic temperature measurement and real-time display of the frying temperature, can remind a user of correction in time when the frying temperature deviates from a specified value, and can guide the user to complete the whole cooking process. The important significance of the present invention lies in that the intelligent seasoning box can replace the work of a cook and it is not necessary to employ the cook with expensive cost. Ordinary persons without any cooking experience can also make professional food. Therefore, the intelligent seasoning box will be benefited to occasions such as families, restaurants, mobile dinning cars and corporate canteens and the like.

In order to realize the above purpose, the present invention discloses an intelligent seasoning box for a kitchen, comprising a shell, a seasoning conveying component, a temperature monitor and a master controller, wherein the seasoning conveying component is a liquid-seasoning conveying component; both the seasoning conveying component and the master controller are arranged in the shell; the temperature monitor is connected by a universal hose and points to the center of a frying pan; the seasoning conveying component and the temperature monitor are electrically connected with the master controller respectively; the shell is provided with a containing cavity for containing liquid-seasoning bottles; the seasoning conveying component comprises conveying pipes, conveying pumps and a spraying nozzle component; the conveying pumps are electrically connected with the master controller; one end of each conveying pipe is inserted into the liquid-seasoning bottle, and the other end of each conveying pipe is connected with the spraying nozzle component; and spraying nozzles on the spraying nozzle component face the frying pan.

Further, the intelligent seasoning box also comprises liquid flow sensors. The liquid flow sensors are installed on the spraying nozzles or in the positions of liquid-seasoning outlet pipes so as to detect the feeding amount of added liquid seasonings.

In the intelligent seasoning box of the present invention, two different output modes can be respectively selected for liquid seasonings according to different user requirements. In one mode, the liquid seasonings are added to the container by the spraying nozzles on the device, and at this moment, the liquid flow sensors are installed in the device. In the other mode, the liquid seasonings are led onto a spraying nozzle seat beside the frying pan through a hose, and at this moment, the flow sensors are installed in the spraying nozzle seat. The liquid flow sensors are installed in the positions of the conveying pumps, which are led out of the tail ends of the conveying pipes and close to the spraying nozzles. The flow sensors are respectively installed in the positions close to the spraying nozzles in the spraying nozzle component or in the device. The flow sensors are used for detecting the flow of the liquid seasonings, and the liquid flow sensors are electrically connected with the master controller. The user can operate a changeover switch to drive a two-position three-way electromagnetic valve installed in the device to control flowing directions of the liquid seasonings so as to select different output modes for working.

Further, a plurality of liquid-seasoning bottles are contained in the containing cavity, and an independent conveying pipe is respectively inserted into each of the liquid-seasoning bottles.

Further, a groove is formed in the shell; the bottom part of the groove is provided with an electronic scale for weighing solid seasonings or liquid seasonings; and the electronic scale is electrically connected with the master controller.

Further, the upper end of the groove is provided with liquid-seasoning outlet pipes which are communicated with the liquid-seasoning bottles through the conveying pumps; and spraying nozzles of the seasoning outlet pipes directly face a platform surface of the electronic scale.

Further, the intelligent seasoning box also comprises a container for fixing a solid seasoning spoon and containing liquid seasonings; the container comprises a first containing cavity for loading the liquid seasonings and a second containing cavity for loading solid seasonings; and one side of the container is also provided with a handheld handle.

Further, both sides of the shell are provided with a plurality of detachable solid seasoning boxes, and the outer sides of the solid seasoning boxes are provided with one-direction opening protective doors.

Further, the solid seasoning boxes are provided with adjustable scraping tongue components for setting the dosage of the solid seasonings; the adjustable scraping tongue components are installed above the inner parts of the solid seasoning boxes; each adjustable scraping tongue component comprises a stepping motor, a fixed scraping plate, a movable scraping plate tongue and a rack fixed to the movable scraping plate tongue; the stepping motor is fixed to the fixed scraping plate; and a gear on the stepping motor is connected with the rack. When the stepping motor works, the rack is driven to slide up and down and drive the movable scraping plate tongue to slide up and down. When the user holds the container and uses the first containing cavity to contain the seasonings in the solid seasoning boxes fully, and then scrapes the position of the movable scraping plate tongues, then the amount of the residual solid seasoning in the first containing cavity of the container is the dosage of the solid seasoning which should be added, so that the purpose of automatically setting the dosage of the solid seasonings is achieved.

Further, the shell is also provided with a display screen which is electrically connected with the master controller.

Further, the shell is also provided with touch keys which are electrically connected with the master controller respectively.

Further, the shell is also provided with an infrared temperature sensor for measuring the temperature in the frying pan. A laser transmitting tube for indicating the position of a temperature measuring region is also installed beside the infrared temperature sensor. A pointing direction of light beams emitted from the laser transmitting tube represents the temperature measuring region of the infrared temperature sensor and shall directly face the center of the frying pan. The infrared temperature sensor and the laser transmitting tube are electrically connected with the master controller respectively. If a red light spot emitted from the laser transmitting tube does not point to the central position of the frying pan, the user can adjust the universal tube by hand to enable the laser transmitting tube to point to the central position of the frying pan.

Further, the master controller is provided with a wireless communication module which communicates with a remote client in a wireless manner.

The present invention has the beneficial effects as follows: compared with the prior art, the intelligent seasoning box for the kitchen disclosed by the present invention is an intelligent device. The shell is provided with the containing cavity for containing original seasoning bottles, and automatic flavoring agents can be automatically added by preset cooking steps in the master controller, so that the operation is simple and convenient. While the seasonings are automatically added, the temperature can also be automatically measured and an instantaneous temperature value can be displayed. If the instantaneous temperature value deviates from needed temperature value, the user can be reminded of adjusting the heat power in time. In addition, for feeding of the solid seasonings, since the adjustable scraping tongue component capable of automatically controlling the fed dosage is installed in each seasoning box, automatic and accurate control for the dosage of the solid seasonings can also be realized, thereby avoiding seasoning-feeding uncertainty caused by errors due to manual feeding of the seasonings and further ensuring the quality of the food.

Figure 1:
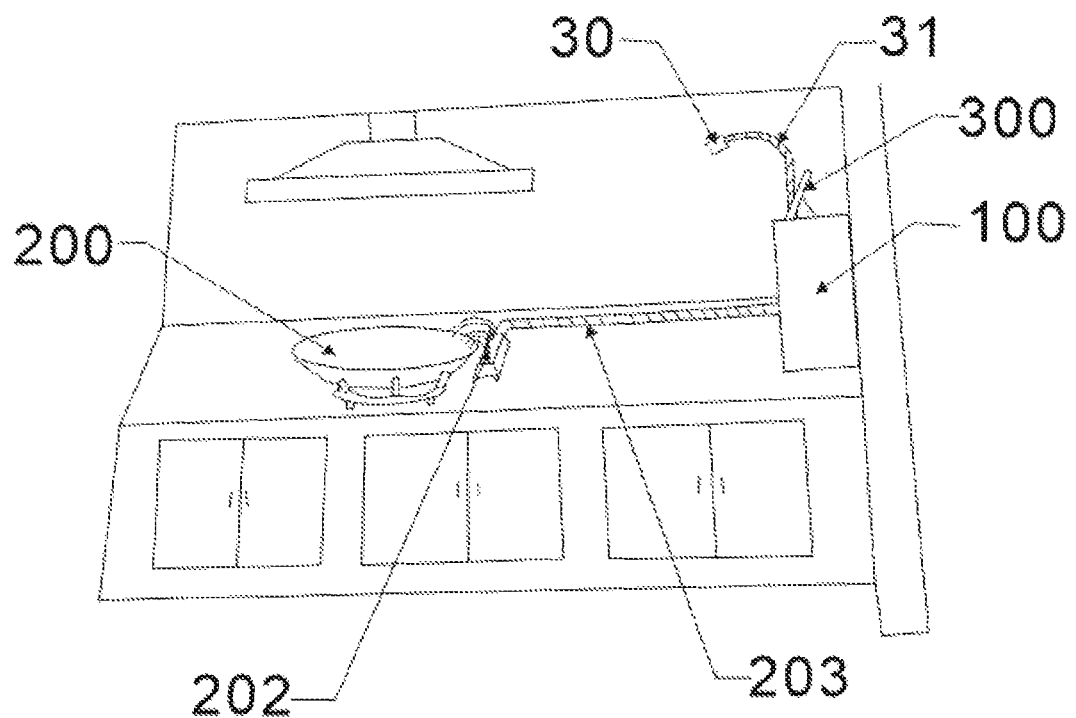
FIG. 1 is a use reference diagram of an intelligent seasoning box for a kitchen of the present invention.
Figure 2:
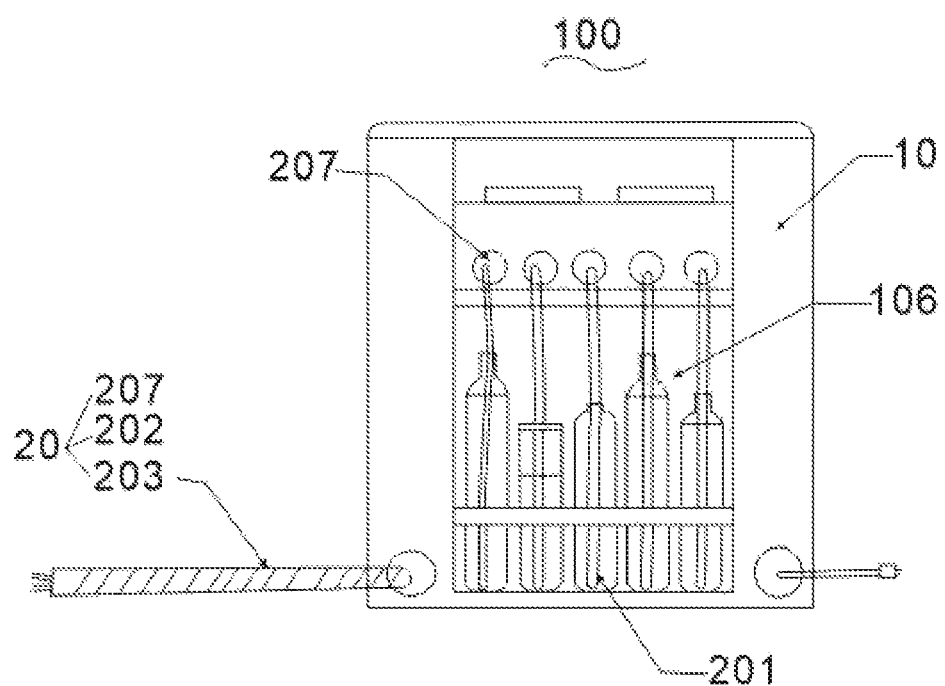
FIG. 2 is a rear view of an intelligent seasoning box for a kitchen of the present invention.
Figure 3:
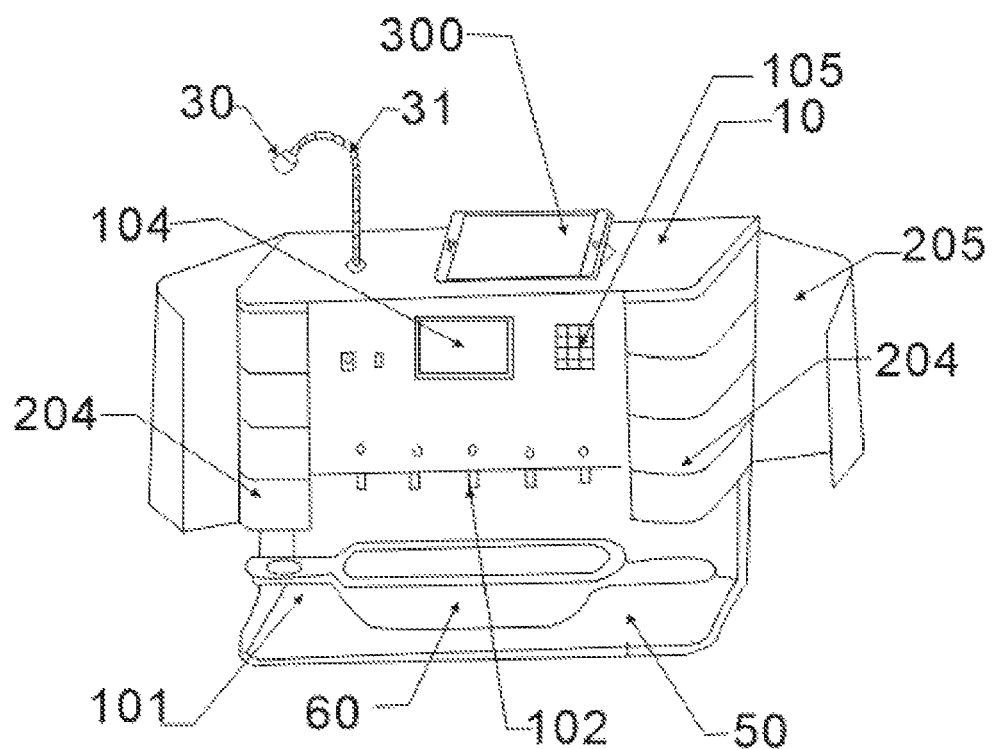
FIG. 3 is a front view of an intelligent seasoning box for a kitchen of the present invention.

Symbol description of main components:

| | |
|---|---|
| 100. Seasoning box | 200. Frying pan |
| 300. Remote client | 400. Master controller |
| 500. Two-position three-way electromagnetic valve | |
| 10. Shell | 20. Seasoning conveying component |
| 30. Temperature monitor | 400. Master controller |
| 50. Electronic scale | 60. Container |
| 101. Groove | 102. Seasoning outlet pipe |
| 106. Containing cavity | 201. Liquid-seasoning bottle |
| 202. Spraying nozzle component | 203. Conveying pipe |
| 204. Solid seasoning box | 205. Protective door |
| 206. Adjustable scraping tongue component | 207. Conveying pump |
| 208. Liquid flow sensor | |
| 2061. Stepping motor | 2062. Fixed scraping plate |
| 2063. Movable scraping plate tongue | 2064. Rack |

DETAILED DESCRIPTION

In order to make the above purpose, features and advantages of the present application clearer and easier to understand, the present application is further described below in detail in combination with drawings and specific embodiments.

It can be understood by those skilled in the art that the singular forms "one", "a", "said" and "the" used herein can also include plural forms. It should be further understood that the word "comprise" used in the description of the present invention means the existence of features, integers, steps, operations, elements and/or components, but does not exclude the existence or addition of one or more other features, integers, steps, operations, elements, components and/or their groups. It should be understood that when the element is "connected" or "coupled" to another element as we called, the element can be directly connected or coupled to other elements, or a middle element can also exist. In addition, "connection" or "coupling" used herein can include wireless connection or wireless coupling. The word "and/or" used herein comprises all or any unit of one or more relevant listed items and combinations of all units.

Referring to FIGS. 1-3 and FIG. 7, in order to realize the above purpose, the present invention discloses an intelligent seasoning box with automatic seasoning addition. The seasoning box 100 comprises a shell 10, a seasoning conveying component 20, a temperature monitor 30 and a master controller 400. Both the seasoning conveying component 20 and the master controller 400 are arranged in the shell 10; the temperature monitor 30 is connected by a universal hose 31 and points to the center of a frying pan 200; the shell 10 is provided with a containing cavity 106 for containing liquid-seasoning bottles 201; and the seasoning conveying component 20 and the temperature monitor 30 are electrically connected with the master controller 400 respectively.

The seasoning conveying component 20 comprises conveying pumps 207, conveying pipes 203 and a spraying nozzle component 202. The spraying nozzle component 202 is provided with liquid flow sensors 208 for accurately detecting the fed amount of the added liquid seasonings. The conveying pipes 203 are provided with the conveying pumps 207 inserted into the shell 10; the conveying pumps 207 are electrically connected with the master controller 400; and the master controller 400 comprises a master control module 41 and a peristaltic-pump driving module 42. The peristaltic-pump driving module 42 is connected with the master control module 41 and is also connected with the conveying pumps 207 to control the conveying pumps 207 to move along forward and backward directions. Output ports of the conveying pumps 207 are connected to liquid-seasoning outlet pipes 102 or are connected with the spraying nozzle component 202 by a section of conveying pipe 203. The liquid seasonings in the liquid-seasoning bottles are extracted by the conveying pumps 207, and after the liquid seasonings are added, the conveying pumps 207 conduct reversal-rotation work and extract residual liquid seasonings in the conveying pipes 203 back into the liquid-seasoning bottles so as to prevent the residual liquid seasonings in pipelines from becoming thickened or cured and blocking the conveying pipe 203 when out of service for long period. The spraying nozzles 2021 point to the frying pan 200. The master controller 400 controls the conveying pumps 207 to convey the liquid seasonings to the seasoning outlet pipes 102 so as to add the liquid seasonings into the container 60; and then the container 60 is held by hand to add the liquid seasonings into the frying pan, or the corresponding liquid seasonings are extracted by the conveying pipes 203 and directly conveyed into the frying pan 200 so as to complete operation of automatic addition of the liquid seasonings.

Figure 8:
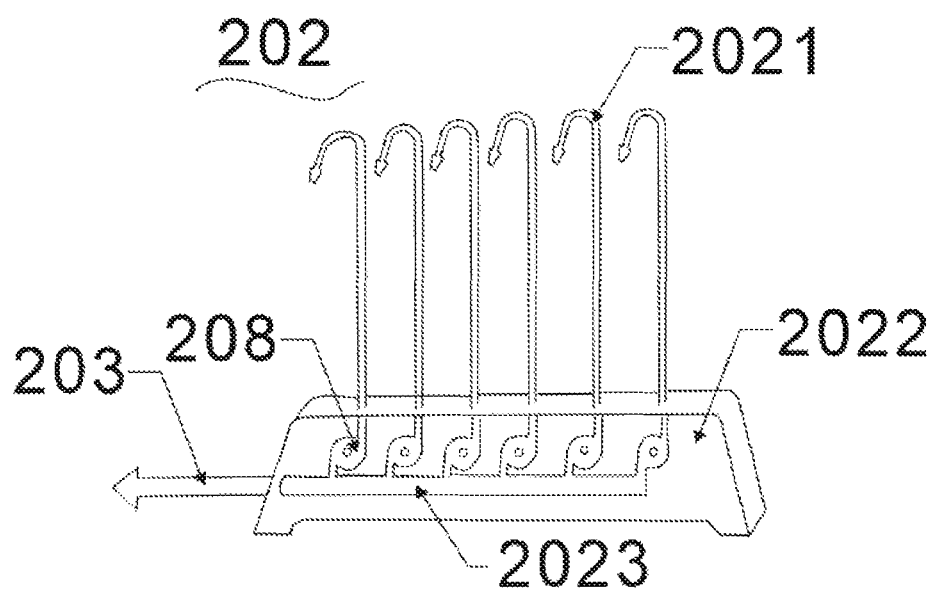
FIG. 8 is a structural schematic diagram of a separated liquid-seasoning spraying nozzle component.

Referring to FIG. 8, in the present embodiment, the spraying nozzle component 202 is a separated spraying nozzle and comprises spraying nozzles 2021, a spraying nozzle seat 2022, a guide pipe 2023 and the liquid flow sensors 208. A plurality of spraying nozzles 2021 are arranged and are respectively provided with one liquid flow sensor 208. One end of each liquid flow sensor 208 is connected with the spraying nozzle 2021, and the other end of each liquid flow sensor is connected with the guide pipe 2023 so as to monitor the fed amount of liquid sprayed by the spraying nozzles 2021, and the guide pipe 2023 is connected with an output pipe 203.

In the present embodiment, the finished liquid-seasoning bottles 201 may be original liquid-seasoning packaging bottles bought from the market by the user. When the relevant finished liquid-seasoning bottles are bought, bottle caps (not shown in figures) for containing the liquid-seasoning bottles are opened to directly place the conveying pipes led out of the input ends of the seasoning pumps into the finished liquid-seasoning bottles 201; the seasonings are automatically added by controlling the conveying pumps 207 in frying; and due to arrangement of the containing cavity 106, the placement of the original seasoning bottles is convenient, and the liquid-seasoning bottles can be neatened and contained.

Further, a plurality of liquid-seasoning bottles 201 can be simultaneously placed in the containing cavity 106. Each liquid-seasoning bottle 201 is respectively connected with one independent conveying pump 207 and generally contains liquid seasonings such as sauce, vinegar, light soy sauce, oil, water and the like. The master controller 400 controls the corresponding conveying pumps 207 to extract the corresponding seasonings at corresponding cooking time nodes according to set menus, and by control of the conveying time of the conveying pumps 207, the addition amount of the seasonings conveyed into the frying pan 200 is controlled. No manual operation is needed in the whole process.

A plurality of detachable solid seasoning boxes 204 for containing solid seasonings are arranged at both sides of the shell 10. The plurality of solid seasoning boxes 204 are arranged at both sides of the shell 10 in sequence in a stacking manner. One-direction opening protective doors 205 are arranged at the outer sides of the solid seasoning boxes 204, thereby effectively preventing insects such as cockroaches and the like from entering and polluting the solid seasonings.

In the present embodiment, a groove 101 is formed in the shell 10. An electronic scale 50 for weighing the seasonings is arranged at the bottom of the groove 101. The master controller 400 also comprises an electronic weighing module 43. The electronic weighing module 43 is electrically connected with the master control module 41 and is also electrically connected with the electronic scale 50 simultaneously. The electronic scale 50 is used for correcting the liquid and solid seasonings. Further, the seasoning output pipes 102 are arranged at the upper end of the groove 101, and are finally communicated with the liquid-seasoning bottles 201 by the flow sensors 208 and the conveying pumps 207. The seasoning output pipes 102 directly faces the electronic scale 50, so that the seasonings in the liquid-seasoning bottles 201 are convenient to fall into a measuring cylinder or a measuring cup, thereby providing another working mode for manually adding the liquid seasonings for the user.

Figure 4:
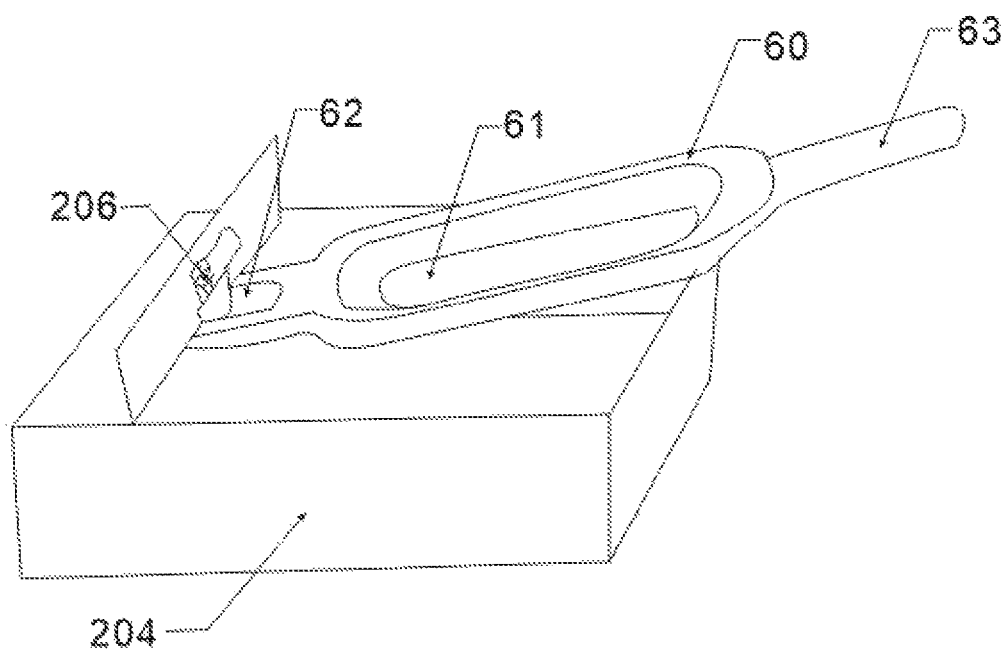
FIG. 4 is a schematic diagram of scraping of solid seasonings of the present invention.

Further, a special container can be also adopted for measuring the liquid or solid seasonings. Referring to FIG. 4, the container 60 is a structure for containing the liquid and solid seasonings in the present invention. The container 60 comprises a first containing cavity 61 for loading the liquid seasonings and a second containing cavity 62 for loading the solid seasonings. The first containing cavity 61 and the second containing cavity 62 are not communicated. In the present embodiment, the liquid seasonings can be stored in the first containing cavity 61 and the solid seasonings can be stored in the second containing cavity 62. After being completely obtained, the solid seasonings and the liquid seasonings can be poured into the frying pan once. In the present embodiment, a handle 63 convenient to hold is arranged on the container 60, and the second containing cavity 62 for fixing a solid seasoning spoon is arranged at the other symmetrical edge of the handle 63. When the seasonings are required to be added, the user only needs to hold the handle 63 by hand to add various seasonings in the container 60 into the frying pan.

Figure 5:
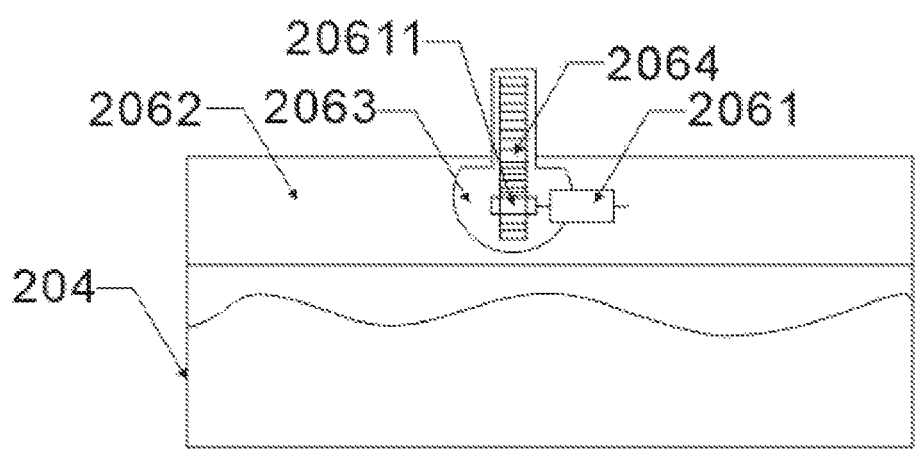
FIG. 5 is a schematic diagram of a position with maximum scraping capacity of an adjustable scraping tongue component of the present invention.
Figure 6:
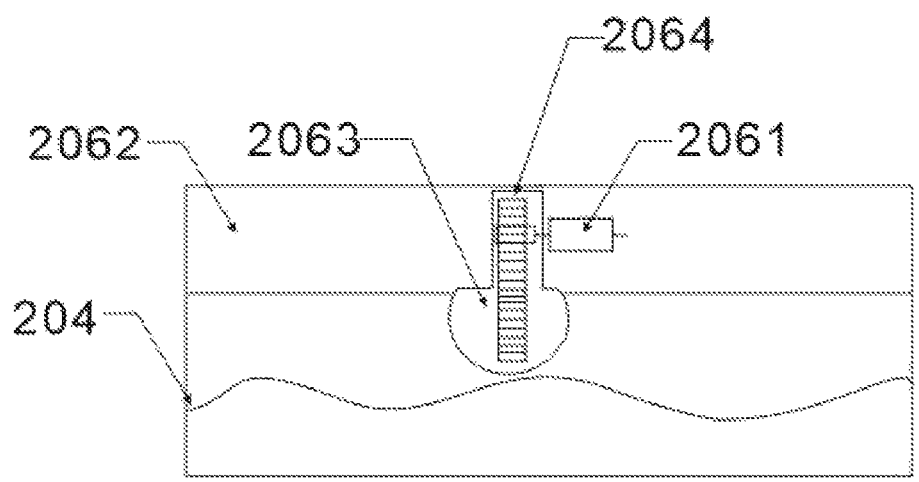
FIG. 6 is a schematic diagram of a position with minimum scraping capacity of an adjustable scraping tongue component of the present invention.

Referring to FIGS. 5-6, further, the solid seasoning box 204 is provided with an adjustable scraping tongue component 206 for setting the solid seasonings. The adjustable scraping tongue component 206 is arranged above the inner part of the solid seasoning box 204 and comprises a stepping motor 2061, a fixed scraping plate 2062, a movable scraping plate tongue 2063 and a rack 2064 fixed to the movable scraping plate tongue 2063. The stepping motor 2061 is fixed to the fixed scraping plate 2062; a gear 20611 on the stepping motor 2061 is meshed with the rack 2064; and the rack 2064 is fixed to the movable scraping plate tongue 2063. During working, the stepping motor 2061 drives the rack 2064 to slide up and down so as to drive the movable scraping plate tongue 2063 to slide up and down. When using the container 60, the user firstly uses the second containing cavity 62 to contain the solid seasonings fully, and then scrapes the movable scraping plate tongue 2063 at the position of the second containing cavity 62 of the container 60 full of the solid seasonings. The amount of the residual solid seasonings in the container 60 is the dosage to be added, thereby realizing automatic feeding of the dosage of the solid seasonings. However, the positioning of the adjustable scraping tongue component 206 is controlled by the stepping motor 2061. Referring to the detailed description in FIG. 5, when the movable scraping plate tongue 2063 moves down to the bottommost-end position, if the seasoning spoon scrapes on the movable scraping plate tongue 2063 at the moment, the minimum dosage of the seasonings can be obtained. Referring to FIG. 6, when moving up to the topmost-end position, the movable scraping plate tongue 2063 retracts into the fixed scraping plate 2062, and if the seasoning spoon scrapes on the movable scraping plate tongue 2062 at the moment, the maximum dosage of the seasonings can be obtained. The positioning of the movable scraping plate tongue 2063 between the maximum dosage and the minimum dosage depends on an output value of an internal application program. In the present embodiment, the master controller 400 also comprises a motor control module 44 which is electrically connected with the stepping motor 2061 and the master control module 41. The master control module 41 controls the stepping motor 2061 to rise and fall by controlling the motor control module 44 according to the menus or preset values, thereby achieving the purpose of automatically setting the dosage of the solid seasonings.

Figure 9:
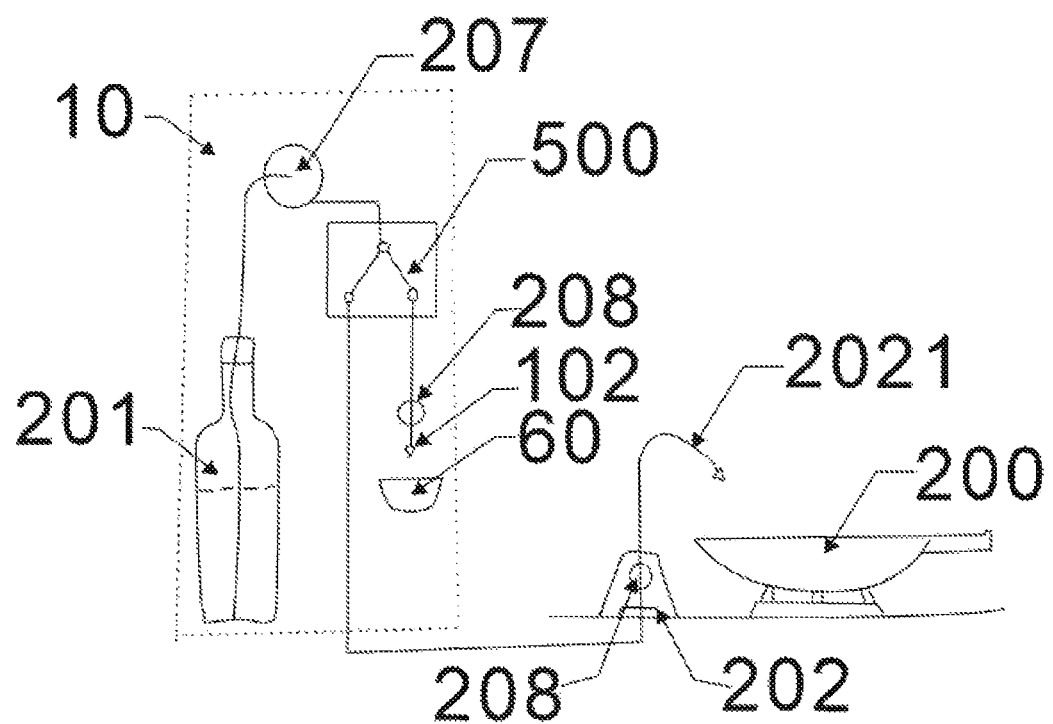
FIG. 9 is a structural schematic diagram for a selective switch to control work of liquid seasonings of the present invention.

Referring to FIG. 9, the above-described mode of adopting the container 60 to receive the liquid seasonings that flow out of the seasoning outlet pipes 102 and the mode of adopting the spraying nozzle component 202 to align with the frying pan 200 to automatically add the liquid seasonings can be separately used. In the present embodiment, the actions of a plurality of two-position three-way electromagnetic valves 500 are controlled by a selective switch so as to select different discharging modes, i.e., the spraying nozzle component 202 is adopted to add the liquid seasonings into the frying pan automatically, or the container 60 is selected to add the liquid seasonings manually. Further, the selective switch is installed on a panel of the shell 10, and is electrically connected with the two-position three-way electromagnetic valves 500 and a power module 49 in the master controller.

Further, a temperature monitor 30 comprises an infrared temperature sensor 32 and a laser transmitting tube (not shown in the figures). The master controller 400 also comprises a temperature monitoring module 45. The temperature monitoring module 45 is electrically connected with the master control module 41 and is also electrically connected with the infrared temperature sensor 32. The laser transmitting tube is connected with the power module 49 by the temperature monitor 30. The master control module 41 controls the temperature monitoring module to drive the infrared temperature sensor 32 to conduct temperature monitoring. The temperature monitor 30 is fixed to the shell 10 by a universal hose 31, and the universal hose 31 can rotate in all directions so as to facilitate the adjustment of the direction of the laser transmitting tube 33 manually. In the present embodiment, both the infrared temperature sensor 32 and the laser transmitting tube 33 point to a same place, and the laser transmitting tube 33 can emit a red light spot. The position corresponding to the red light spot is the position for temperature monitoring by the infrared temperature sensor 32, so the user is convenient to confirm the correctness of temperature measurement. Temperature data measured by the infrared temperature sensor 32 is transmitted to the master controller 400.

Figure 7:
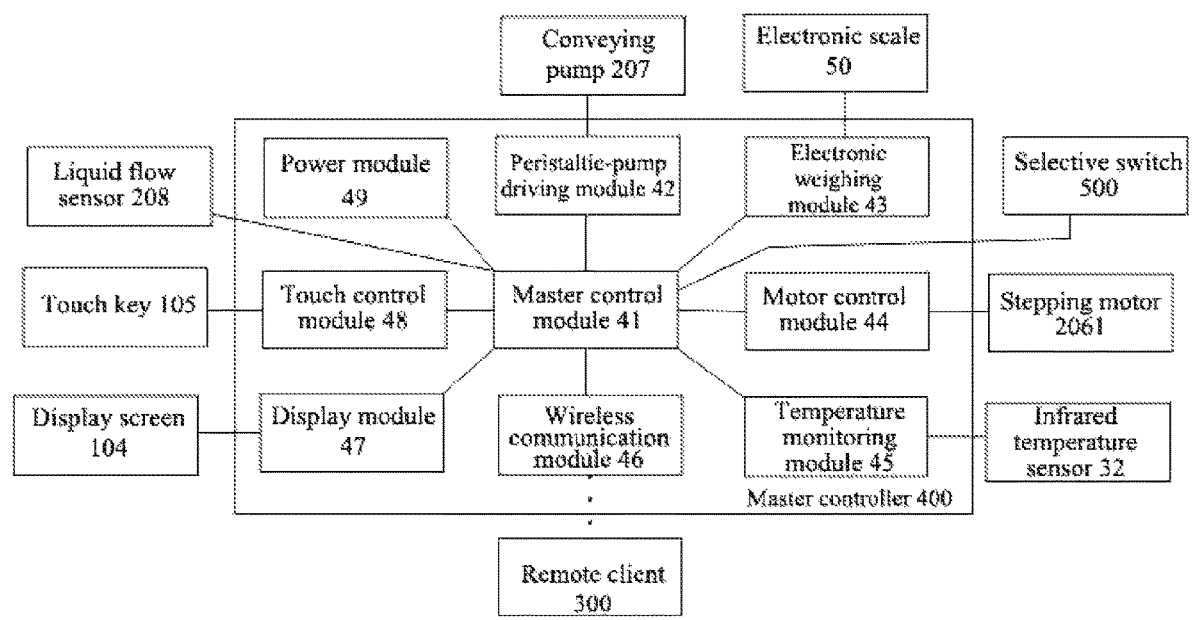
FIG. 7 is a schematic diagram of a seasoning box control module of the present invention.

Referring to FIG. 7, in the present embodiment, the master controller 400 is provided with a wireless communication module 46, and the master control module 41 communicates with a remote client 300 in a wireless manner by the wireless communication module 46. In the present embodiment, the remote client 300 may be a terminal such as a mobile phone, a computer or a tablet computer and the like. By means of the remote client 300, the current temperature data of the frying pan can be seen in time, and relevant menu information or relevant operation instructions also can be transmitted to the seasoning box with automatic seasoning addition through the remote client 300. The wireless communication module 46 may be a Bluetooth module or a WiFi module.

Further, in the present embodiment, the master controller 400 also comprises the power module 49 for supplying power to the whole intelligent seasoning box for the kitchen and a display module 47. The display module 47 and the power module 49 are electrically connected with the master control module 41 respectively. The display module 47 is electrically connected with a display screen 104 on the shell 10. The master control 41 also comprises a touch control module 48, and the touch control module 48 is electrically connected with touch keys 105 to control the triggering of the touch keys 105. After receiving an instruction of touching the touch keys 105, the master control module 41 controls the seasoning box 100 to execute corresponding application programs, so that the seasoning box 100 can conduct actions of automatically measuring the temperature and automatically adding various seasonings and the like. In the present embodiment, the remote client 300 means the mobile phone or the tablet computer of the user, communicates with the intelligent seasoning box for the kitchen by the wireless communication module 46, and has two functions of (1) downloading the menu selected by the user to the master controller 400 for later use and (2) directly running the APP programs on the remote client 300. At the moment, the remote client 300 should be placed above the shell 10 so as to bring convenience for the user to watch the screen. The remote client 300 can communicate with a host by the wireless communication module 46 and execute frying operation in an online manner. Compared with the display screen 104 on the intelligent seasoning box for the kitchen, the remote client 300 can guide the user to operate by demonstration of videos or animations. In this way, the remote client 300 can be more intuitive and vivid and can be more easily accepted than text prompting of the display screen 104.

The above disclosures are only several specific embodiments of the present invention, but not limited to this. Any change which can be contemplated by those skilled in the art shall be included in the protection scope of the present invention.

What is claimed is:

1. An intelligent seasoning box for a kitchen, comprising a shell, a seasoning conveying component, a temperature monitor and a master controller, wherein the seasoning conveying component is a liquid-seasoning conveying component; both the seasoning conveying component and the master controller are arranged in the shell; the temperature monitor is connected by a universal hose and points to the center of a frying pan; the seasoning conveying component and the temperature monitor are electrically connected with the master controller respectively; the shell is provided with a containing cavity for containing liquid-seasoning bottles; the seasoning conveying component comprises conveying pipes, conveying pumps and a spraying nozzle component; the conveying pumps are electrically connected with the master controller; one end of each conveying pipe is inserted into the liquid-seasoning bottle, and the other end of each conveying pipe is connected with the spraying nozzle component; and spraying nozzles on the spraying nozzle component face the frying pan; and a groove is formed in the shell; the bottom of the groove is provided with an electronic scale for weighing seasonings; and the electronic scale is electrically connected with the master controller; and an upper end of the groove is provided with seasoning outlet pipes which are communicated with the liquid-seasoning bottles and connected with the conveying pumps; and the seasoning outlet pipes directly face the electronic scale.

2. The intelligent seasoning box for the kitchen according to claim 1, wherein the intelligent seasoning box also comprises liquid flow sensors; and the liquid flow sensors are installed on the spraying nozzles or in the positions of liquid-seasoning outlet pipes so as to detect the feeding amount of added liquid seasonings.

3. The intelligent seasoning box for the kitchen according to claim 1, wherein a plurality of liquid-seasoning bottles are contained in the containing cavity, and an independent conveying pipe is respectively inserted into each of the liquid-seasoning bottles.

4. The intelligent seasoning box for the kitchen according to claim 3, wherein the intelligent seasoning box also comprises a container for fixing a solid seasoning spoon and containing liquid seasonings; the container comprises a first containing cavity for loading the liquid seasonings and a second containing cavity for loading solid seasonings; and a containing position for fixing the solid seasoning spoon and a handheld handle are respectively arranged on both sides of the container.

5. The intelligent seasoning box for the kitchen according to claim 1, wherein both sides of the shell are provided with a plurality of detachable solid seasoning boxes, and the outer sides of the solid seasoning boxes are provided with one-direction opening protective doors.

6. The intelligent seasoning box for the kitchen according to claim 5, wherein the solid seasoning boxes are provided with adjustable scraping tongue components for setting the dosage of the solid seasonings; the adjustable scraping tongue components are arranged above the inner parts of the solid seasoning boxes; each adjustable scraping tongue component comprises a stepping motor, a fixed scraping plate, a movable scraping plate tongue and a rack fixed to the movable scraping plate tongue; the stepping motor is fixed to the fixed scraping plate; a gear on the stepping motor is connected with the rack; and when the stepping motor works, the rack is driven to slide up and down and drive the movable scraping plate tongue to slide up and down to automatically set the dosage of the solid seasonings.

7. The intelligent seasoning box for the kitchen according to claim 1, wherein the temperature monitor comprises an infrared temperature sensor and a laser transmitting tube; and the infrared temperature sensor and the laser transmitting tube are installed above the shell and are electrically connected with the master controller respectively.

8. The intelligent seasoning box for the kitchen according to claim 1, wherein the shell is also provided with a display screen which is electrically connected with the master controller.

9. The intelligent seasoning box for the kitchen according to claim 1, wherein the shell is also provided with touch keys which are electrically connected with the master controller respectively.

10. The intelligent seasoning box for the kitchen according to claim 1, wherein the shell is also provided with an infrared temperature sensor for measuring the temperature in the frying pan; a laser transmitting tube for indicating a temperature measuring position of is also installed at one side of the infrared temperature sensor; light beams emitted from the laser transmitting tube point to the center of the frying pan; and the infrared temperature sensor and the laser transmitting tube are electrically connected with the master controller respectively.

11. The intelligent seasoning box for the kitchen according to claim 1, wherein the master controller is provided with a wireless communication module which communicates with a remote client in a wireless manner.

\* \* \* \* \*